(12) United States Patent
Arndt et al.

(10) Patent No.: US 9,668,415 B2
(45) Date of Patent: Jun. 6, 2017

(54) BASECUTTER BLADE CONTROL FOR A CANE HARVESTER

(71) Applicant: CNH Industrial America LLC, New Holland, PA (US)

(72) Inventors: Bruce Arndt, Algonquin, IL (US); Daenio Cleodolphi, Nova Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/579,010

(22) Filed: Dec. 22, 2014

(65) Prior Publication Data

US 2015/0181804 A1 Jul. 2, 2015

Related U.S. Application Data

(60) Provisional application No. 61/921,950, filed on Dec. 30, 2013.

(51) Int. Cl.
| | | |
|---|---|---|
| *A01D 69/00* | (2006.01) | |
| *A01D 45/10* | (2006.01) | |
| *A01D 34/80* | (2006.01) | |

(52) U.S. Cl.
CPC ............ *A01D 45/10* (2013.01); *A01D 34/80* (2013.01)

(58) Field of Classification Search
CPC ........ A01D 45/10; A01D 34/38; A01D 34/63; A01D 34/685; A01D 34/80; A01D 34/8355; A01D 47/00; Y10T 83/4836
USPC ..................................................... 56/53, 63
See application file for complete search history.

(56) References Cited

U.S. PATENT DOCUMENTS

| | | | | |
|---|---|---|---|---|
| 2,569,507 A | * | 10/1951 | Von Schlegell | ....... A01D 34/38 56/11.9 |
| 3,434,271 A | * | 3/1969 | Fogels | .................... A01D 45/10 56/13.8 |
| 3,673,774 A | * | 7/1972 | Mizzi | ..................... A01D 45/10 56/13.3 |
| 3,848,399 A | * | 11/1974 | Makeham | .............. A01D 45/10 56/13.9 |
| 3,995,520 A | * | 12/1976 | Spargo | .................... A01D 45/10 56/13.9 |
| 4,065,912 A | * | 1/1978 | Quick | .................... A01D 45/10 56/13.9 |
| 4,070,809 A | * | 1/1978 | Soulat | .................... A01D 45/10 56/13.9 |
| 4,126,989 A | * | 11/1978 | Oosterling | ............. A01D 34/66 56/11.9 |
| 4,170,098 A | * | 10/1979 | Moreno | ................. A01D 45/10 56/13.4 |
| 4,270,337 A | | 6/1981 | Pinto | |

(Continued)

*Primary Examiner* — Árpád Fábián-Kovács
(74) *Attorney, Agent, or Firm* — Peter K. Zacharias; Patrick M. Sheldrake

(57) ABSTRACT

A cane harvester including a support member and a basecutter assembly carried by the support member. The basecutter assembly includes a plurality of basecutter units and a control system. The plurality of basecutter units include first and second basecutter units. The first basecutter unit has a first set of blades and the second basecutter has a second set of blades. The first set of blades are rotatable by the first basecutter unit, and the second set of blades are rotatable by the second basecutter unit. The control system is configured to synchronize the first set of blades with the second set of blades.

19 Claims, 3 Drawing Sheets

(56) References Cited

U.S. PATENT DOCUMENTS

| | | | |
|---|---|---|---|
| 4,272,947 A | 6/1981 | Mizzi | |
| 4,386,492 A * | 6/1983 | Tilby | A01D 45/10 56/13.9 |
| 4,646,512 A * | 3/1987 | Scott | A01D 45/10 56/13.9 |
| 4,856,265 A * | 8/1989 | Wolf | A01D 34/71 56/202 |
| 4,896,491 A * | 1/1990 | Warnsholz | A01D 46/085 56/10.2 R |
| 4,897,986 A * | 2/1990 | Baker | A01D 45/10 384/537 |
| 4,924,662 A * | 5/1990 | Quick | A01D 45/10 56/12.8 |
| 5,031,392 A * | 7/1991 | Baker | A01D 45/10 460/123 |
| 5,157,904 A * | 10/1992 | Otten | A01D 45/10 56/14.3 |
| 5,191,759 A * | 3/1993 | Baker | A01D 45/10 56/500 |
| 5,430,997 A | 7/1995 | O'Halloran et al. | |
| 5,463,856 A * | 11/1995 | Beckwith | A01D 45/10 460/134 |
| 5,622,034 A | 4/1997 | Dommert | |
| 6,131,378 A | 10/2000 | Lees | |
| 6,272,819 B1 * | 8/2001 | Wendte | A01D 41/127 460/6 |
| 6,363,700 B1 * | 4/2002 | Fowler | A01D 45/10 56/13.3 |
| 6,500,062 B1 * | 12/2002 | Harris | A01D 45/10 460/79 |
| 6,508,049 B1 * | 1/2003 | Cox | A01D 45/10 56/10.2 R |
| 6,591,593 B1 * | 7/2003 | Brandon | A01D 34/006 56/10.6 |
| 7,313,902 B1 * | 1/2008 | Eavenson, Sr. | A01D 34/661 56/13.6 |
| 7,640,718 B2 | 1/2010 | Altepost et al. | |
| 7,658,059 B2 * | 2/2010 | Majkrzak | A01D 34/38 56/264 |
| 8,230,668 B2 * | 7/2012 | Hinds | A01D 45/10 56/53 |
| 8,230,669 B2 * | 7/2012 | Hinds | A01D 45/10 56/53 |
| 8,578,688 B2 * | 11/2013 | Hinds | A01D 45/003 56/102 |
| 2002/0104300 A1 * | 8/2002 | Hunt | A01D 34/008 56/10.6 |
| 2006/0086076 A1 | 4/2006 | Krone et al. | |
| 2008/0295478 A1 * | 12/2008 | Majkrzak | A01D 34/38 56/257 |
| 2009/0223194 A1 * | 9/2009 | Joia | A01D 25/02 56/28 |
| 2010/0307121 A1 * | 12/2010 | Marchini | A01D 75/28 56/63 |

* cited by examiner

BASECUTTER BLADE CONTROL FOR A CANE HARVESTER

CROSS REFERENCE TO RELATED APPLICATIONS

This is a non-provisional application based upon U.S. provisional patent application Ser. No. 61/921,950, entitled "BASECUTTER BLADE CONTROL FOR A CANE HARVESTER", filed Dec. 30, 2013, which is incorporated herein by reference.

BACKGROUND OF THE INVENTION

1. Field of the Invention

The present invention relates to cane harvesters, and, more particularly, to basecutter assemblies used in cane harvesters.

2. Description of the Related Art

Sugarcane and *sorghum* are two types of stalk-like crops that are commercially grown. Other cane-like crops, such as *miscanthus*, energy cane, and giant reed, have received attention as a form of bio-energy. During the harvesting of cane, often the top of the plant is cut off with a separate cutter head. The top portion of the plant may be allowed to simply fall to the ground, or seeds therein may be gathered by the harvester.

*Sorghum* is a major grain crop and the cane of *sorghum* is used for sugar products. *Sorghum* is one of the oldest known crops and is used as a staple food in many parts of the world.

Sugarcane is native to temperate to tropical regions, the cane has stout, jointed, fibrous stalks that are rich in sugar and measure six to nineteen feet tall. Once sugarcane is planted, a stand can be harvested several times. After each harvest, the cane sends up new stalks called rattons. Each successive harvest produces a decreasing yield, eventually leading to a needed replanting operation.

The harvesting of sugarcane includes the cutting of the cane at the base of the stalk, stripping the leaves, chopping the cane into consistent lengths, and depositing the cane into a transporting device. The harvester typically blows the leaves and such back onto the ground.

Sugarcane harvesting machines utilize a basecutter device that is integral with the main frame of the machine. The height of the cut is regulated by the raising and lowering of the main portion of the machine or of the basecutter assembly.

Sugarcane harvesting or cut operations require a certain degree of precision for good crop yield. Ideally, the cut height should be substantially close to the surface of the ground so as to harvest the optimal crop without damage to the equipment and at minimal cost.

The market is demanding the crop harvesting of multiple rows of cane to compensate for areas with low yield and to improve performance relative to energy usage. If the cane harvester design needs to increase the disc diameter this results in a gearbox being heavier, bigger, more expensive and limiting to the design freedom of the harvester.

What is needed in the art is a way to effectively eliminate the gearbox, to reduce the weight and the size needed for the basecutter assembly.

SUMMARY OF THE INVENTION

The present invention provides an inventive control of basecutter units to enhance cane harvesting.

The invention in one form is directed to a cane harvester including a support member and a basecutter assembly carried by the support member. The basecutter assembly includes a plurality of basecutter units and a control system. The plurality of basecutter units include first and second basecutter units. The first basecutter unit has a first set of blades and the second basecutter has a second set of blades. The first set of blades are rotatable by the first basecutter unit, and the second set of blades are rotatable by the second basecutter unit. The control system is configured to synchronize the first set of blades with the second set of blades.

The invention in another form is directed to a basecutter assembly for use in a cane harvester. The basecutter assembly includes a plurality of basecutter units and a control system. The plurality of basecutter units include first and second basecutter units. The first basecutter unit has a first set of blades and the second basecutter has a second set of blades. The first set of blades are rotatable by the first basecutter unit, and the second set of blades are rotatable by the second basecutter unit. The control system is configured to synchronize the first set of blades with the second set of blades.

The invention in yet another form is directed to a method of controlling a basecutter assembly used in a cane harvester. The method includes the steps of rotating a first set of blades of a first basecutter unit, rotating a second set of blades of a second basecutter unit and a synchronizing step. The synchronizing step includes the synchronizing of the first set of blades with the second set of blades using a control system.

An advantage of the present invention is that the sugarcane harvester does not need the weight and mechanical linkages of a gearbox to synchronize basecutter blades.

Another advantage is that the present invention allows design flexibility of the harvester.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
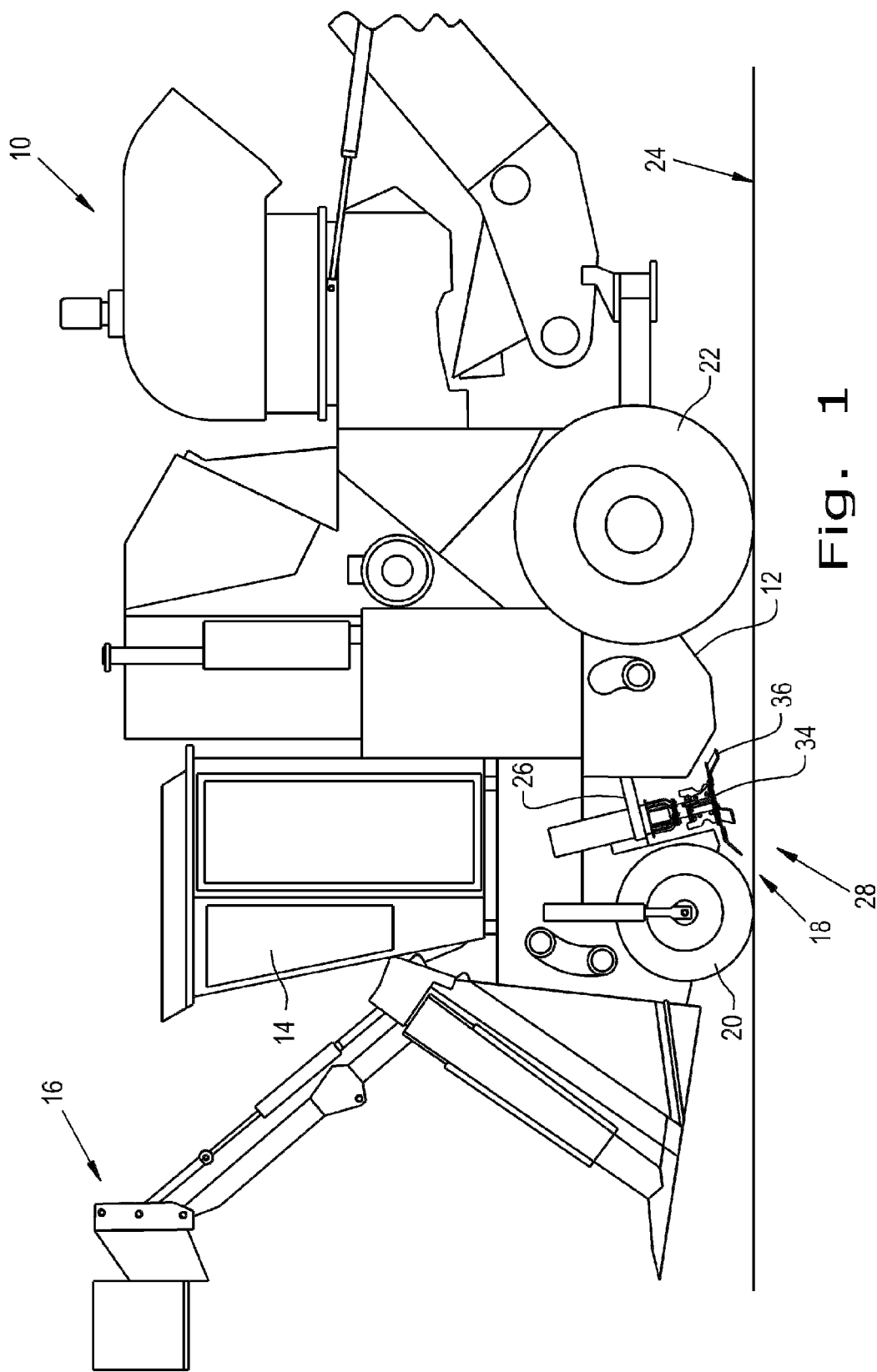
FIG. 1 is a partial side view depicting, partly in representational form, a sugarcane harvester having an embodiment of a basecutter assembly constructed in accordance with the present invention.

Referring now to the drawings, and more particularly to FIG. 1, there is shown a cane harvester 10, which generally includes a chassis 12, a cab 14, a topper 16, a basecutter assembly 18, a pair of front wheels 20 and a pair of rear wheels 22, upon a ground surface 24. A support member 26 couples basecutter assembly 18 to chassis 12.

Although sugarcane harvester 10 is depicted having wheels 20 and 22, it will be appreciated that tracks or other support mechanisms could be equally as well employed and are not considered critical to the present invention or its practice.

Figure 2:
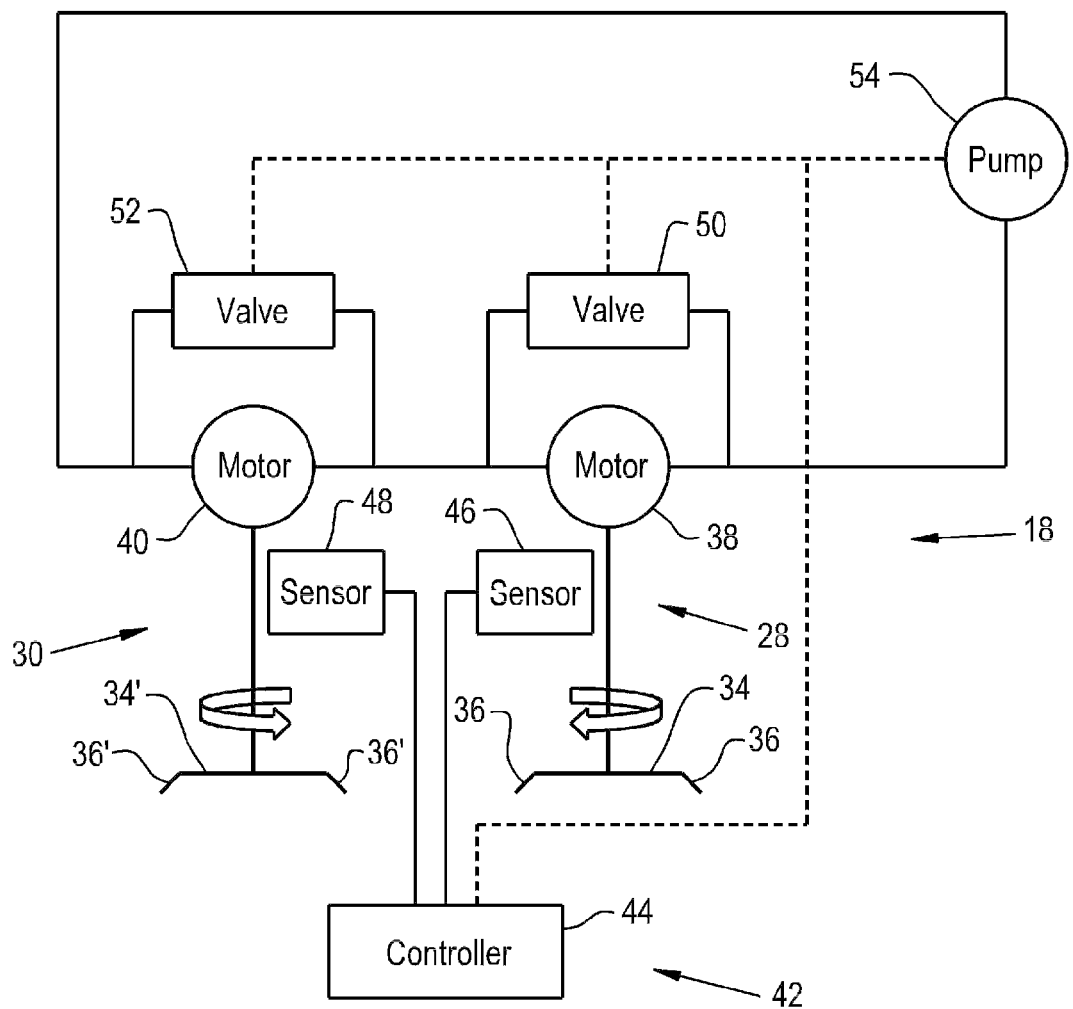
FIG. 2 is a schematical view of a basecutter assembly used in the cane harvester of FIG. 1.
Figure 3:
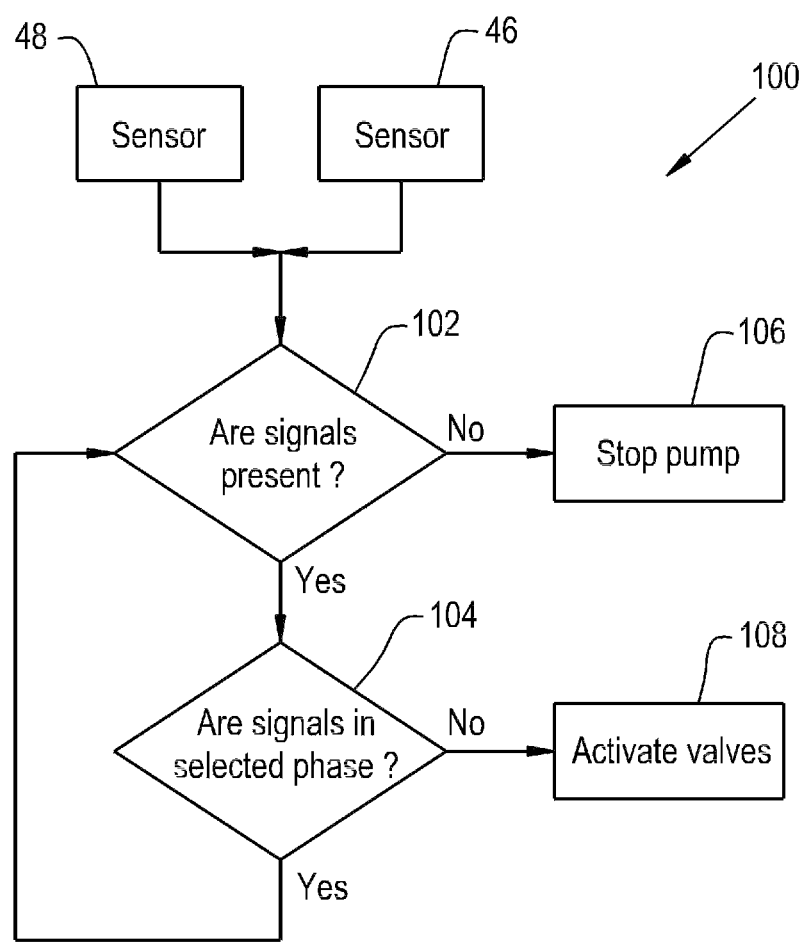
FIG. 3 is a state diagram that illustrates how part of the inventive control system of FIG. 2 works.

Now, additionally referring to FIGS. 2 and 3, there is shown additional details of basecutter assembly 18. Basecutter assembly 18 is shown in FIG. 1 as being connected to chassis 12 by way of support member 26. In the preferred embodiment depicted, basecutter assembly 18 includes a basecutter unit 28 and a basecutter unit 30 configured to function in a counter-rotating manner. Basecutter units 28 and 30 are each respectively driven by separate hydraulic motors 38 and 40, which are respectively operatively coupled to drive rotary cutter discs 34 and 34' that are respectively equipped with blades 36 and 36'. Hydraulic motors 38 and 40 are operatively connected to a hydraulic pump 54, typically positioned proximate to the engine of harvester 10.

Basecutter assembly 18 includes a control system 42 that controls the operation of basecutter units 28 and 30. Control system 42 includes a controller 44, sensors 46 and 48, and valves 50 and 52. Controller 44 may be a standalone controller or the functions herein attributed to controller 44 may be carried out by some other controller that is a part of cane harvester 10. The diagram of FIG. 2, discussed in more detail later, can also be thought of as being symbolic and it is contemplated that the hydraulic connections of motors 48 and 40 may be in a parallel fashion as an alternative to the serial connection shown. However, the serial connection as depicted reflects the preferred embodiment of the present invention.

Sensors 46 and 48 provide signals with position information relative to the position of blades 36 and 36' to controller 44. Sensors 46 and 48 sense a position of a rotating component, relative to time, in motors 38 and 40, a position of a rotating shaft, a position of disks 34 and 34' and/or a position of individual blades 36 and 36'. The information ultimately relates to the position of blades 36 and 36' regardless of which moving component that sensors 46 and 48 are sensing the position thereof. When basecutter assembly 18 is engaged, by way of a command to controller 44 by way of a user interface (not shown) or some other device sending a command to controller 44, then motors 38 and 40 are activated by turning pump 54 on and positioning valves 50 and 52 so that hydraulic fluid is directed to motors 38 and 40. Pressurized hydraulic fluid is controllably sent to motors 38 and 40 so that blades 36 and 36' are synchronized with each other, so that as blades 36 and 36' counter-rotate relative to each other they do not come into contact with each other.

A method 100 is illustrated in FIG. 3, where input from sensors 46 and 48 is detected at step 102. If both signals are present then method 100 proceeds to step 104, where the two signals are compared to see if the signals are of a preselected phase relative to each other. It is understood that the location of the sensors may be offset such that if the phase of the signals are in phase that blades 36 and 36' are sequenced to move such that as they pass at their closest approach to each other that they are substantially equidistant to/from a preceding or succeeding blade on the opposite disk 34, 34'. For purposes of discussion hereafter, it will be assumed that sensors 46 and 48 are placed at similar locations on both of basecutter units 28 and 30. This then would mean that when the signals are in phase that a blade 36 of basecutter unit 28 would be pointed at a blade 36' of basecutter unit 30, which can be an interfering situation. Another way to think of this arrangement is if the signals and basecutter units 28 and 30 are in phase the blade positions and movement would be a mirror image of each other.

To interleave blades 36 with blades 36' to prevent interference then the phase relationship of the signals need to be held ideally at a maximum, or opposite phase. Control system 42 sends signals to valves 50 and 52 to control the speed of motors 38 and 40, at step 108, so that there is a substantially fixed phase relationship with the signals. This fixed relationship is an out of phase relationship and more specifically an opposite phase relationship.

More specifically, control system 42 sends signals to valves 50 and 52 to control the speed of motors 38 and 40 so that there is a substantially fixed phase relationship between blades 36 and blades 36'. This fixed relationship is an out of phase relationship and more specifically an opposite phase relationship of blades 36 and 36'.

If only one signal, or no signal, is detected at step 102 then pump 54 is stopped at step 106. Controller 44 may operate method 100 using a phase-locked loop system, where either of the signals can be considered a reference signal. However, in the present invention either signal or both signals can be affected by controller 44 in order to maintain the desired phase relationship between blades 36 and blades 36'.

In the present invention a closed hydraulic circuit can be used with independent fixed displacement hydraulic motors 38 and 40 connected in series to move cutter discs 34 and 34' in opposite rotational directions in order to feed the cane stalks into the throat of cane harvester 10. Valves 50 and 52 are electro-proportional flow control valves 50 and 52 that allow the diversion of part of the flow to reduce the shaft rpm, under the control of controller 44, to correct the phase relationship of the signals and thus the phase relationship of blades 36 and 36'. At each basecutter unit 38 and 40, sensors 46 and 48 detect the position and speed, and send signals to controller 44, which process the information of the signals and uses a control algorithm to activate flow control valves 50 and 52 that are respectively related to motors 38 and 40 in order to maintain a selected phase relationship of blades 36 and 36'. If for any reason one basecutter unit 28 or 30 gets blocked due to stones or other material, the serial relationship of the hydraulic circuit has a tendency to also stop the other basecutter unit. Such a stoppage will result in the signals indicating no positional change and a stop pump command 106 is issued to pump 54.

In the mechanical assembly of basecutter assembly 18 blades 36 and 36' are synchronized and then the signals of sensors 46 and 48 are continuously compared to ensure that the signals have the selected phase relationship. When a difference in the phase relationship is detected control system 42 generates a command to the appropriate valve 50 or 52 to reduce the speed of one of the basecutter units 28 or 30, in order to adjust the speed and as a consequence the re-phasing of blades 36 and 36'. Control system 42 when needed can also act to increase the speed of one basecutter unit 28 or 30 to also re-phase blades 36 and 36'. Control system 42 can also act to increase the speed of one basecutter unit 28 or 30 and decrease the speed of the other basecutter unit 28 or 30 to accomplish the goal of keeping the phase relationship of blades 36 and 36' within a desired tolerance.

In a typical phase-locked loop control system often a controlled oscillator establishes the reference signal and an item under control produces a signal that is then used to compare to the reference signal. Then the control system adjusts some aspect of the item under control so that the signal from the item under control is in a phase-locked situation with the reference signal. However, in the present invention it can be understood that one of the signals from sensors 46 or 48 serves as a reference signal. Another way of looking at this is that both signals can serve as reference signals with control system 42 deciding which motor, or whether both motors need control adjustments. Control system 42 can consider the amount of remaining adjustment in flow control valves 50 and 52 to decide which valve to adjust, so in this sense, the signal from sensor 46 or 48 of the other basecutter unit 28 or 30 becomes the reference signal.

Advantageously, the present invention increases or decreases the speed of basecutter units 28 and 30 so that the blade rotation remains synchronized. Another advantage is that larger cutting profiles are possible without adding the weight and taking the space of a gearbox.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cane harvester, comprising:
  a support member;
  a basecutter assembly carried by said support member, said basecutter assembly including a plurality of basecutter units including a first basecutter unit and a second basecutter unit, said first basecutter unit having a first set of blades and said second basecutter having a second set of blades, said first set of blades being rotatable by said first basecutter unit, said second set of blades being rotatable by said second basecutter unit, said basecutter units each including a motor;
  a control system coupled to the cane harvester, said control system comprising a controller configured to synchronize said first set of blades with said second set of blades by independent adjustments of each of the motors of said basecutter units;
  a first sensor configured to generate a first signal indicative of a position of said first set of blades; and
  a second sensor configured to generate a second signal indicative of a position of said second set of blades, said controller being configured to use said first signal or said second signal as a reference signal.

2. The cane harvester of claim 1, wherein, said controller is further configured to cause said first set of blades to be out of phase with said second set of blades.

3. A cane harvester, comprising:
  a support member;
  a basecutter assembly carried by said support member, said basecutter assembly including a plurality of basecutter units including a first basecutter unit and a second basecutter unit, said first basecutter unit having a first set of blades and said second basecutter having a second set of blades, said first set of blades being rotatable by said first basecutter unit, said second set of blades being rotatable by said second basecutter unit, said basecutter units each including a motor;
  a control system coupled to the cane harvester, said control system comprising a controller configured to synchronize said first set of blades with said second set of blades by independent adjustments of each of the motors of said basecutter units, said first set of blades being rotatable in a first direction, and said second set of blades being rotatable in a second direction, said first direction being contra to said second direction;
  a first sensor configured to generate a first signal indicative of a position of said first set of blades; and
  a second sensor configured to generate a second signal indicative of a position of said second set of blades, said controller being configured to use said first signal or said second signal as a reference signal.

4. The cane harvester of claim 3, wherein said controller is further configured to:
  receive said first signal from said first sensor and said second signal from said second sensor;
  compare said first signal to said second signal to determine if said first and second signals are of a preselected phase relative to each other; and
  cause said first set of blades to be rotating with a substantially fixed phase relationship relative to said second set of blades.

5. The cane harvester of claim 3, wherein said controller is further configured to cause said first set of blades to be out of phase with said second set of blades.

6. The cane harvester of claim 5, wherein said controller is further configured to cause said first set of blades to be substantially of an opposite phase from said second set of blades.

7. The cane harvester of claim 3, wherein said motors of said first basecutter unit and said second basecutter unit are fluidically driven motors.

8. The cane harvester of claim 7, wherein said basecutter assembly further includes a plurality of valves fluidically coupled to at least one of said motor of said first base cutter unit and said motor of said second basecutter unit, said controller being in controlling communication with said plurality of valves.

9. A basecutter assembly for use in a cane harvester, the basecutter assembly comprising:
  a plurality of basecutter units including a first basecutter unit and a second basecutter unit, said first basecutter unit having a first set of blades and said second basecutter having a second set of blades, said first set of blades being rotatable by said first basecutter unit, said second set of blades being rotatable by said second basecutter unit, said basecutter units each including a motor;
  a control system operatively coupled to said basecutter units, said control system comprising a controller configured to synchronize said first set of blades with said second set of blades by independent adjustment of each of the motors of said basecutter units;
  a first sensor configured to generate a first signal indicative of a position of said first set of blades; and
  a second sensor configured to generate a second signal indicative of a position of said second set of blades.

10. The basecutter assembly of claim 9, wherein, said controller is further configured to cause said first set of blades to be out of phase with said second set of blades.

11. A basecutter assembly for use in a cane harvester, the basecutter assembly comprising:
  a plurality of basecutter units including a first basecutter unit and a second basecutter unit, said first basecutter unit having a first set of blades and said second basecutter having a second set of blades, said first set of blades being rotatable by said first basecutter unit, said second set of blades being rotatable by said second basecutter unit, said basecutter units each including a motor;
  a control system operatively coupled to said basecutter units, said control system comprising a controller configured to synchronize said first set of blades with said second set of blades by independent adjustment of each of the motors of said basecutter units, said first set of blades rotatable in a first direction, and said second set of blades rotatable in a second direction, said first direction being contra to said second direction;

a first sensor configured to generate a first signal indicative of a position of said first set of blades; and a second sensor configured to generate a second signal indicative of a position of said second set of blades.

12. The basecutter assembly of claim 11, wherein said controller is further configured to:
receive said first signal from said first sensor and said second signal from said second sensor;
compare said first signal to the second signal to determine if said first and second signals are of a preselected phase relative to each other; and
cause said first set of blades to be rotating with a substantially fixed phase relationship relative to said second set of blades.

13. The basecutter assembly of claim 12, wherein said controller is further configured to cause said first set of blades to be out of phase with said second set of blades.

14. The basecutter assembly of claim 13, wherein said controller is further configured to cause said first set of blades to be substantially of an opposite phase from said second set of blades.

15. The basecutter assembly of claim 11, wherein said motors of said first basecutter unit and said second basecutter unit are fluidically driven motors.

16. The basecutter assembly of claim 15, further comprising a plurality of valves fluidically coupled to at least one of said motor of said first base cutter unit and said motor of said second basecutter unit, said controller being in controlling communication with said plurality of valves.

17. A method of controlling a basecutter assembly used in a cane harvester, the method comprising the steps of:
rotating a first set of blades of a first basecutter unit using a first motor;
rotating a second set of blades of a second basecutter unit using a second motor; and
synchronizing, by a controller of a control system, said first set of blades with said second set of blades by independent adjustment of said first motor and said second motor;
receiving a first signal from a first sensor indicative of a position of said first set of blades;
receiving a second signal from a second sensor indicative of a position of said second set of blades;
wherein said step of synchronizing comprises:
receiving said first signal from said first sensor and said second signal from said second sensor;
comparing said first signal to said second signal to determine if said first and second signals are of a preselected phase relative to each other; and
synchronizing said first set of blades to rotate with a substantially fixed phase relationship relative to said second set of blades.

18. The method of claim 17, wherein said step of synchronizing further comprises synchronizing said first set of blades to be out of phase with said second set of blades.

19. The method of claim 17, wherein said step of synchronizing further comprises synchronizing said first set of blades to be substantially of an opposite phase from said second set of blades.

* * * * *